(12) United States Patent
Takizawa

(10) Patent No.: US 6,513,870 B1
(45) Date of Patent: Feb. 4, 2003

(54) CHILD CAR SEAT

(75) Inventor: Manabu Takizawa, Urawa (JP)

(73) Assignee: Combi Corporation, Tokyo-to (JP)

( * ) Notice: Subject to any disclaimer, the term of this patent is extended or adjusted under 35 U.S.C. 154(b) by 87 days.

(21) Appl. No.: 09/671,291

(22) Filed: Sep. 27, 2000

(30) Foreign Application Priority Data

Sep. 28, 1999 (JP) .......................................... 11-274894

(51) Int. Cl.⁷ ............................ B60N 2/427; B60N 2/28
(52) U.S. Cl. ............................ 297/216.11; 297/216.13
(58) Field of Search ....................... 297/216.11, 216.13, 297/216.19, 250.1, 256.13, 216.15

(56) References Cited

U.S. PATENT DOCUMENTS

| | | | |
|---|---|---|---|
| 3,922,035 A | * 11/1975 | Wener | 297/256.13 |
| 4,215,900 A | * 8/1980 | Coult | 297/216.11 |
| 4,480,870 A | * 11/1984 | von Wimmerspeg | 297/216.11 |
| 5,490,706 A | 2/1996 | Totani | |
| 5,551,751 A | * 9/1996 | Sedlack et al. | 297/216.11 |
| 5,664,830 A | 9/1997 | Carcia et al. | |
| 5,685,603 A | 11/1997 | Lane, Jr. | |

FOREIGN PATENT DOCUMENTS

| | | | |
|---|---|---|---|
| DE | 1163168 | 2/1964 | |
| FR | 2596338 | * 10/1987 | 297/216.11 |
| WO | 88/09633 | 12/1888 | |
| WO | 97/10117 | 3/1997 | |

* cited by examiner

Primary Examiner—Peter R. Brown
(74) Attorney, Agent, or Firm—Wenderoth, Lind & Ponack, L.L.P.

(57) ABSTRACT

A child car seat comprises a child car seat body, a back portion, and a seat portion connected to the child car seat body. The back portion is rotatably connected to the child car seat body, and the bottom end of the back portion is pulled toward the seat portion side by a spring member at a normal time. At a time of impact, an impact force larger than a force of the spring member rotates the back portion so that the back portion moves away from the seat portion.

8 Claims, 8 Drawing Sheets

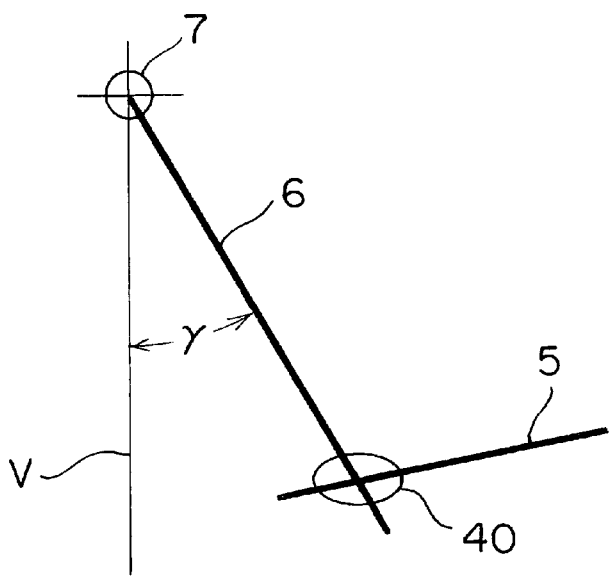
F I G. 3A
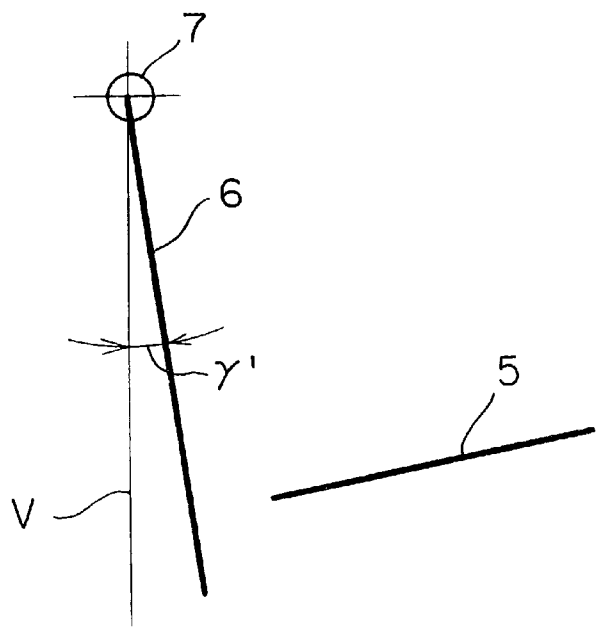
F I G. 3B

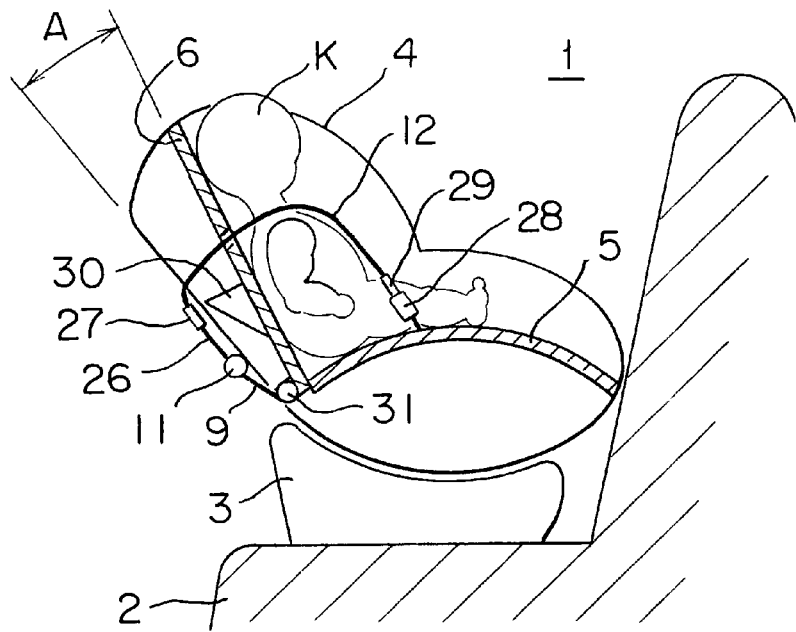
F I G. 7A
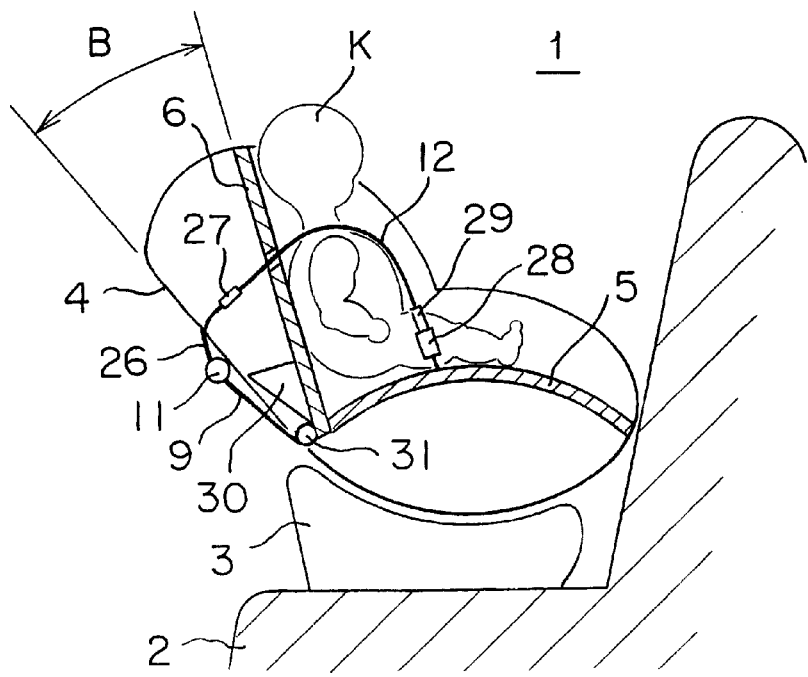
F I G. 7B

CHILD CAR SEAT

TECHNICAL FIELD

The present invention relates to a child car seat having a back portion, in which an impact load at a time of impact can be absorbed by the back portion.

BACKGROUND OF THE INVENTION

Generally, when a newborn (child) is placed in a child car seat, a back portion of the child car seat is inclined as much as possible so that the newborn can lie on its back in the seat, because the neck of the newborn is not strong yet. When a child weighing less than 10 kg is positioned in the seat, the child car seat is fixed backward with respect to a vehicle travelling direction (seat). When an impact load acts on the front part of a vehicle with the seat fixed in the way mentioned above, the newborn's shoulder is subjected to a concentrated load through a shoulder belt.

FIG. 9 illustrates the magnitude of impact of a collision or the like acting on the newborn.

In FIG. 9, a seat belt S is applied to the newborn K who is laid at an angle of $\alpha$ with respect to a vertical line. Then, referring to impact force on the entire body of the newborn K caused by the collision or an emergency braking of the vehicle as F, the impact force on the shoulder of the newborn K as $F_1$, and the impact force on the back of the newborn K as $F_2$, the impact force F acting on the entire body of the newborn in the travelling direction of the vehicle is determined by a product of a mass of the newborn and deceleration. However, since the newborn K is braced in the child car seat, the impact force can be divided into a force component parallel to the back portion of the child car seat (namely the impact force $F_1$ acting on the shoulder) and a force component perpendicular to the back portion of the child car seat (namely the impact force $F_2$ acting on the back) as shown in formula (1).

$$F=\sqrt{F_1'^2+F_2'^2} \quad (1)$$

And since an inclination angle of the child car seat is $\alpha$, the following formulas (2), (3) are obtained.

$$F_1=F \sin \alpha \quad (2)$$

$$F_2=F \cos \alpha \quad (3)$$

With the newborn K laid in the child car seat in the most inclined position, when the angle $\alpha$ increases, the force $F_1$, acting on the shoulder becomes large in proportion to $\sin \alpha$. Moreover, while the impact force $F_2$ acting on the back is absorbed by the entire back portion, the impact force $F_1$ acting on the shoulder is concentrated on a contact point between the seat belt and the shoulder. Therefore, the damage to the shoulder portion can be significant.

Since the conventional child car seat fixed backward to the vehicle's travelling direction is so constructed that the impact force acts only on the shoulder belts at an impact time, the impact force concentrated on the frail shoulders of the newborn or child (hereafter referred to as "child") caused significant damage to the shoulder.

SUMMARY OF THE INVENTION

The object of the invention is to provide a child car seat in which an impact force acting on the shoulders of a child can be reduced by dispersing the impact force at the time of impact.

According to the present invention, a child car seat comprises a child car seat body, a back portion and a seat portion connected to the child car seat body. The back portion is rotatably connected to the child car seat body, and the back portion can be rotated between a normal position at a normal time where an angle between the back portion and a vertical plane is large, and an impact position at the impact time where the angle between the back portion and the vertical plane is small.

In the child car seat, the top end of the back portion may be rotatably connected to the child car seat body.

In the child car seat, the bottom end of the back portion may be connected to the seat portion through a spring member, and the back portion may take the normal position on the seat portion side at the normal time and the impact position away from the seat portion at the impact time.

In the child car seat, the bottom end of the back portion may be engaged by a hooking device connected to the child car seat body.

In the child car seat, the hooking device may have a hooking surface engaging the back portion in the normal position and a reset slope engaging with the back portion in the impact position.

In the child car seat, the hooking device may be connected to the child car seat body so that the device is allowed to swing freely.

In the child car seat, the hooking device may be biased by a spring toward the back portion.

In the child car seat, the bottom end of the back portion may be connected to the bottom by a connecting member to be broken at the time of impact. The back portion may take the normal position on the seat portion side at the normal time, and take the impact position where the connecting member is broken at the time of impact and the seat portion is away from the seat portion.

In the child car seat, a belt for holding the child may be installed between the bottom end of the back portion and the seat portion in order to rotate the back portion by force acting on the belt from the child at the impact time.

In the child car seat, the bottom end of the back portion may be rotatably connected to the child car seat body.

In the child car seat, the rear side of the back portion may be equipped with a moving wedge that moves along the back portion to rotate the back portion.

In the child car seat, the moving wedge may be arranged between the child car seat body and the back portion.

In the child car seat, the moving wedge may be arranged between an auxiliary plate installed on the child car seat body and the back portion.

In the child car seat, the moving wedge may be arranged between an auxiliary plate attached to the child car seat body and the back portion.

In the child car seat, the belt for holding the child may be installed between the moving wedge and the seat portion, and the moving wedge may be moved along the back portion by the force acting on the belt from the child to rotate the back portion.

BRIEF DESCRIPTION OF THE DRAWINGS

FIG. 3A illustrates a third embodiment of the child car seat of the present invention at the normal time.

FIG. 3B illustrates the third embodiment of the child car seat of the present invention at the impact time.

FIG. 7A is a schematic diagram of the child car seat shown in FIG. 6 at the normal time.

FIG. 7B is a schematic diagram of the child car seat shown in FIG. 6 at the impact time.

FIG. 8 is a schematic diagram illustrating a magnitude of impact acting on a child at a collision time or the like.

DETAILED DESCRIPTION OF THE INVENTION

First Embodiment

Figure 1A:
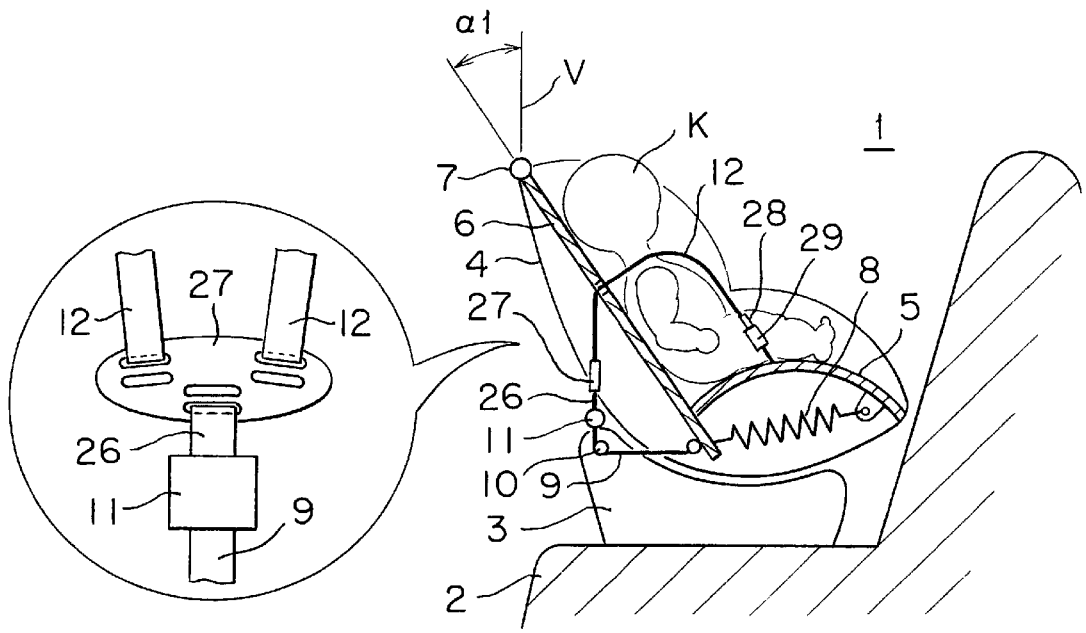
FIG. 1A illustrates a first embodiment of a child car seat of the present invention at a normal time.
Figure 1B:
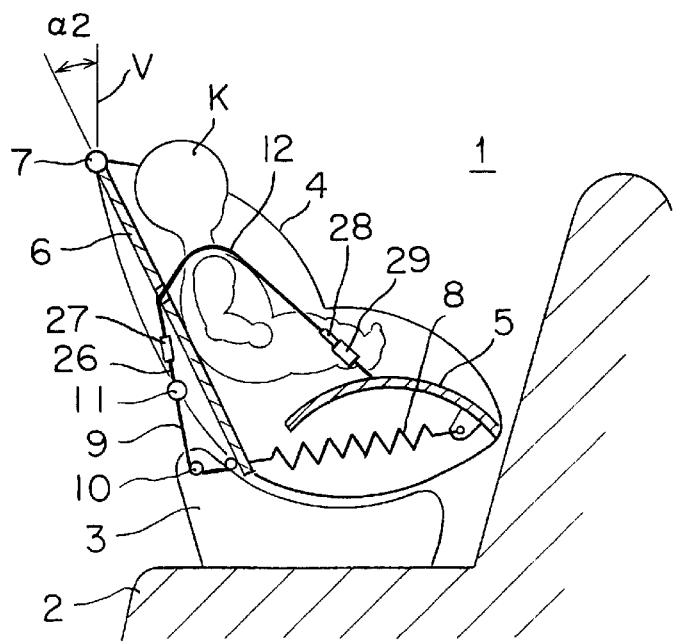
FIG. 1B illustrates the first embodiment of the child car seat of the present invention at an impact time.

A first embodiment of the present invention is described in detail referring to FIGS. 1A and 1B.

FIGS. 1A and 1B show the first embodiment of the present invention. In particular, FIG. 1A shows a child car seat 1 facing backward at a normal time, and FIG. 1B shows the child car seat facing backward at the time of impact.

The child car seat 1 for a child comprises a base 3, a child car seat body 4 mounted on the base 3, a seat portion 5 and a back portion 6 connected to the child car seat body 4. The child car seat 1 is mounted on a seat 2 of a vehicle facing forward, or facing backward as shown in FIGS. 1A and 1B. When the vehicle carries a child, the child car seat is often mounted facing backward as shown in the drawings.

As mentioned above, the seat portion is fixed on the child car seat body 4, while the top end of the back portion 6 is rotatably connected to the body 4 through a rotating shaft 7. Further, a spring member 8 is installed between the bottom end of the back portion 6 and the seat portion 5 in order to constantly bias the back portion counter-clockwise around the rotating shaft 7 shown in FIGS. 1A and 1B so as to hold the back portion so that it contacts the seat portion 5.

The car seat also includes a belt device as shown in FIGS. 1A and 1B. The belt device includes a belt 9, retractor 11, shaft 10, and shoulder belt (shoulder strap) 12. The bottom end of the back portion 6 is connected with an end of the belt 9. The other end of the belt 9 is connected to the emergency lock type retractor 11 located at the rear side of the back portion 6 (on the left of FIGS. 1A and 1B) through the fixing shaft 10 installed in the base 3. The retractor 11 houses a back belt 26 in a wound condition, and a belt adjuster 27 is connected to the tip end of the back belt 26. One end of the shoulder belt 12 is connected to the belt adjuster 27, while the other end of the shoulder belt 12 is connected with a tongue 28 which can be attached to or detached from a buckle 29 connected to the seat portion 5.

In addition, the emergency lock type retractor 11 is constructed so as to restrict drawing of the back belt 26 when an acceleration force larger than a predetermined force acts on the retractor.

The child K usually sits on the child car seat 1 in the normal condition as shown in FIG. 1A. However, when an impact force caused by a collision or the like acts on the vehicle, this child K is subjected to a load component parallel to the back portion 6, and the child moves upward to abruptly pull the shoulder belt 12. Then the retractor 11 detects that motion to lock the drawing of the back belt 26 and the shoulder belt 12. Consequently, the belt 9 pulls the bottom end of the back portion 6 against the biasing force of the spring member 8, rotates the back portion clockwise around the rotating shaft 7 as shown in FIGS. 1A and 1B, and reduces an angle of $\alpha_1$, between the back portion 6 and a vertical plane V to that of $\alpha_2$. Therefore, a component of the impact force perpendicular to the back portion increases and a component parallel to the back portion drastically decreases to prevent a load concentration on the shoulder part of the child K. FIG. 1A shows the back portion 6 at the normal time (normal position) and FIG. 1B shows the back portion 6 at the time of impact (impact position).

Figure 8:
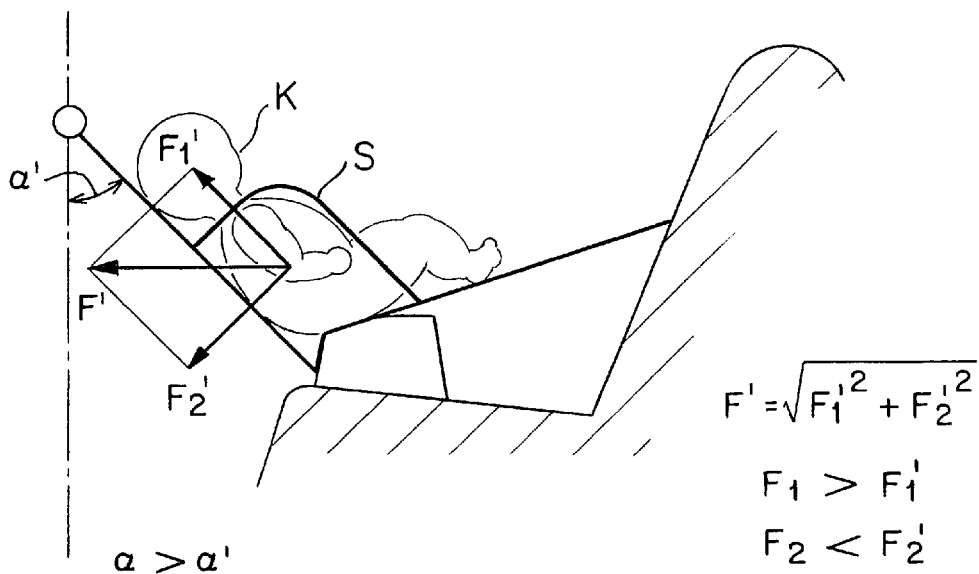

In the above case shown in FIG. 1B, force $F_1'$ acting on the shoulder part of the child K and force $F_2'$ acting on the back part in FIG. 8 are described as follows:

$$F = \sqrt{F_1'^2 + F_2'^2} \quad (4)$$

Since an inclination angle of the back portion of the child car seat is $\alpha'$, the following formulas are obtained.

$$F_1' = F \sin \alpha' \quad (5)$$

$$F_2' = F \cos \alpha' \quad (6)$$

Figure 9:
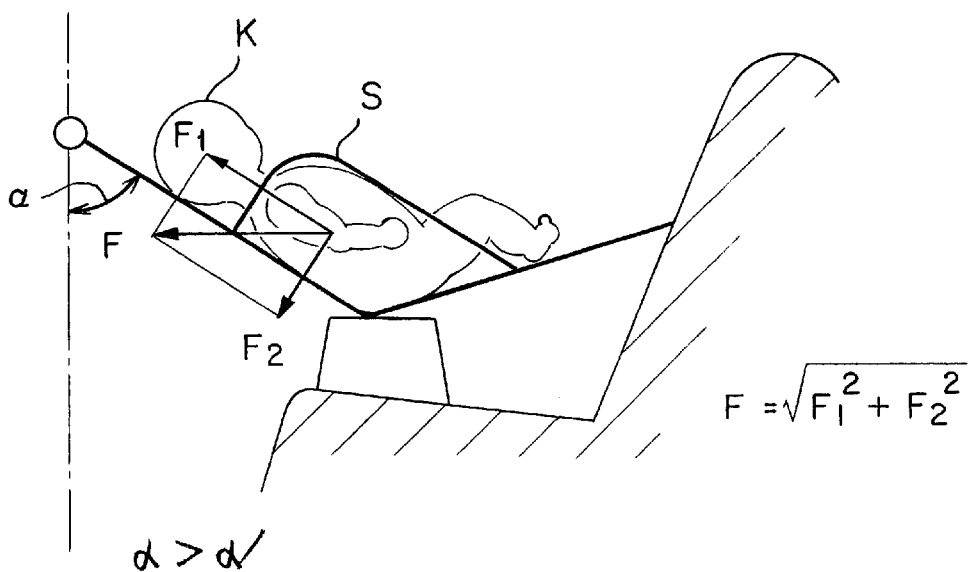
FIG. 9 is a schematic diagram of a conventional child car seat at the time of impact.

Since the present invention is designed so that the inclination angle $\alpha'$ of the back portion at the impact time is smaller than the inclination angle $\alpha$ of the back portion before the impact time (see FIG. 9), formulas (7) and (8) are established.

$$F_1 > F_1' \quad (7)$$

$$F_2 < F_2' \quad (8)$$

In this case, formula (7) shows that force $F_1'$ acting on the back of the child K is smaller than force $F_1$.

And, although formula (8) shows that force $F_2'$ acting on the back is larger than force $F_2$, there is no special problem because the load acts on the back of the child K through the back portion 6 of the child car seat 1 as a surface load in this case instead of a point load applied by the shoulder belt 12 acting on the shoulder.

Second Embodiment

Figure 2A:
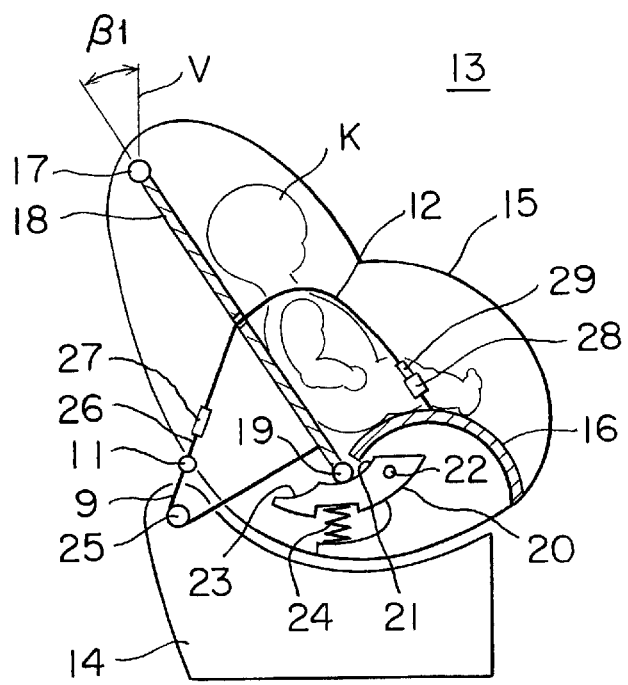
FIG. 2A illustrates a second embodiment of the child car seat of the present invention at the normal time.
Figure 2B:
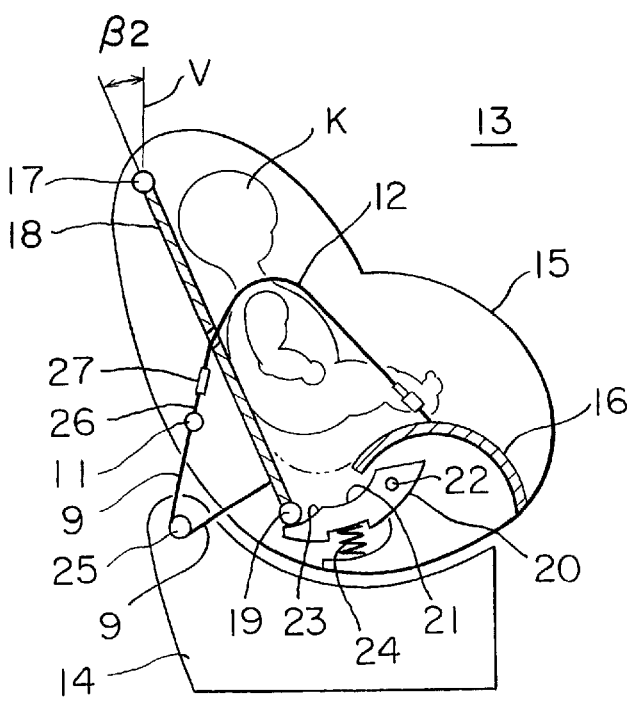
FIG. 2B illustrates the second embodiment of the child car seat of the invention at the impact time.

FIGS. 2A and 2B show a second embodiment of the invention. In particular, FIG. 2A shows a child car seat at a normal time, and FIG. 2B shows the same at an impact time.

In the second embodiment, a child car seat body 15 mounted on a base 14 of a child car seat 13 is provided with a fixing seat portion 16, and the top end of a back portion 18 is connected to the child car seat body 15 with a hinge through a rotating shaft 17. This is substantially the same as in the first embodiment. However, an elastic support structure of the bottom end of the back portion 18 is different from the first embodiment.

The bottom end of the back portion 18 is provided with a moving body 19 including a roller or a plastic slide body, and this moving body 19 is engaged with an elastic hooking device 20 attached to the child car seat body 15. The elastic hooking device 20 has a shape similar to a half moon, and an end of the hooking device is rotatably supported by the child car seat body 15 through a pin 22 under the fixing seat portion 16. The elastic hooking device 20 has a hooking surface 21 that engages the moving body 19 of the back portion 18, which is in a normal position at the top of one portion of the device 20. The top of the other portion of the device 20 is provided with a reset slope 23 extending from this hooking surface so as to engage with the moving body 19 of the back portion 18 which is in an impact position. A spring 24 is attached under the elastic hooking device 20, so as to raise the elastic hooking device 20 toward the back portion 18.

In addition, a shoulder belt 12 is crossed over the shoulder of a child K, and one end of the shoulder belt 12 is fixed to the fixed seat portion 16 through a buckle (not illustrated), while the other end of the shoulder belt 12 is connected to a retractor 11.

One end of a belt 9 is fixed to the bottom end of the back portion 18, and the other end of the belt 9 is connected to the retractor 11 through a fixing shaft 25 installed in the base 14.

At the normal time shown in FIG. 2A, even if a vehicle is subjected to a normal range of acceleration and deceleration during travelling, the moving body 19 attached to the bottom end of the back portion 18 moves only within a range of the hooking surface 21 of the elastic hooking device 20, and does not shift to the reset slope 23 to move the bottom end of the back portion forward.

However, if the vehicle is subjected to an impact force, such as an emergency brake and a collision at the impact time, the condition shifts to that shown in FIG. 2B. Since the child K is subjected to a load component parallel to the back portion 18 caused by an impact force, a force of pulling out the shoulder belt 12 acts on the shoulder of the child K, and the retractor 11 locks the shoulder belt. As a result, the belt 9 pulls the bottom end of the back portion 18 according to the invention, and then the moving body 19 attached to the bottom end the back portion 18 disengages from the hooking surface 21 of the elastic hooking device 20 to move down along the reset slope 23, and the bottom end of the back portion 18 moves forward.

Consequently, an angle between the back portion 18 and a vertical plane V drastically decreases from $\beta_1$ to $\beta_2$, a load component perpendicular applied to the back portion 18 increases, and a load component parallel to the back portion 18 decreases to prevent a load concentration on the shoulder of the child K. When the child K falls down in the fixing seat portion, the load applied to the shoulder of the child K can be released. Although the load component perpendicular to the back portion 18 also increases in this case, the child is prevented from being subjected to a large concentration load because this load acts on the entire shoulder of the child to reduce force per unit area.

Third Embodiment

FIGS. 3A and 3B show a principle of a third embodiment, in particular FIG. 3A shows a child car seat at a normal time, and FIG. 3B shows the seat at a time of impact.

In the third embodiment, the child car seat is constructed so that a seat portion 5 and a back portion 6 are connected with a connecting member 40 made of a material to be broken at a connecting portion by impact force, and the back portion 6 and the seat portion are connected at the normal time. The connecting member 40 is broken and the seat portion 5 and the back portion 6 are disconnected by the impact force at the time of impact, and the back portion 6 rotates to move in a direction away from the seat portion 5.

In FIG. 3A, the top end of the back portion 6 is rotatably connected to a child car seat body 4 through a rotating shaft 7, and the bottom end of the back portion is connected to the seat portion 5 with the impact destructive connecting member 40 while an inclination angle of y between the back portion 6 and a vertical plane V is maintained at the normal time. The impact destructive connecting member can be a fixture made of a material such as a plastics pin that is easily broken by the impact force.

In FIG. 3B showing the child car seat at the impact time, when the impact destructive connecting member 40 is broken by the impact force, the bottom end of the back portion 6 is disconnected from the fixing seat portion 5, rotates around the rotating shaft 7, and stops at the position where the back portion 6 moves backward till the inclination angle with the vertical plane V reaches y'(y'<y).

Therefore, at the normal time, the child K lies on its back supported by the back portion 6 at an inclination angle of y, while the fixing seat portion 5 is in the condition shown in FIG. 3A.

If a collision accident occurs, the impact destructive connecting member 40 connecting the fixing seat portion 5 and the back portion 6 is broken by collision impact, and the back portion 6 rotates around the rotating shaft 7 till the inclination angle becomes y'(y'<y ) and then stops. Therefore, as in the case of FIG. 1A and FIG. 1B, a load component perpendicular to the back portion 6 increases and the load component parallel to the back portion 6 drastically decreases so that the load concentration on the shoulder portion of the child K can be prevented. Although the load component perpendicular to the back portion 18 increases in this case, the child is prevented from being subjected to a large load concentration because this load component perpendicular to the back portion 18 acts on the entire shoulder of the child to reduce force per unit area.

Thus, the impact destructive connecting member 40 can manufacture the child car seats having a simpler structure at a cheaper cost than in the first embodiment.

Further, although a rotating center of the back portion is assumed to be located at the top end in each embodiment, it is not limited to the top end. As an alternative, the rotating center may be located at a point between the top and bottom or at the bottom end. It is only essential that the rotating center location allows the back portion to move uprightly.

Fourth Embodiment

A fourth embodiment in which a rotating center of a back portion is located at the bottom end is described.

Figure 4:
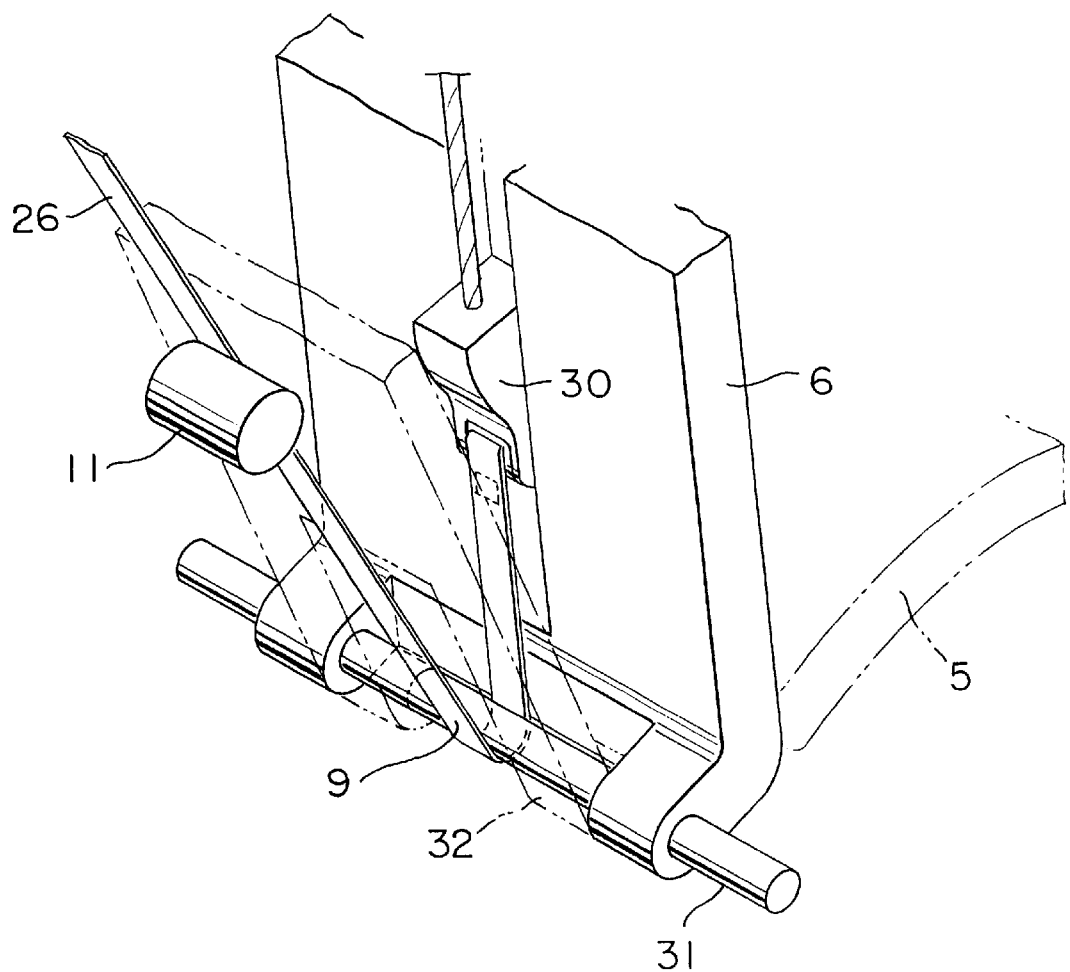
FIG. 4 shows a fourth embodiment of the child car seat of the present invention, in particular a partial perspective of a rear side of a back portion that is an essential part.
Figure 5A:
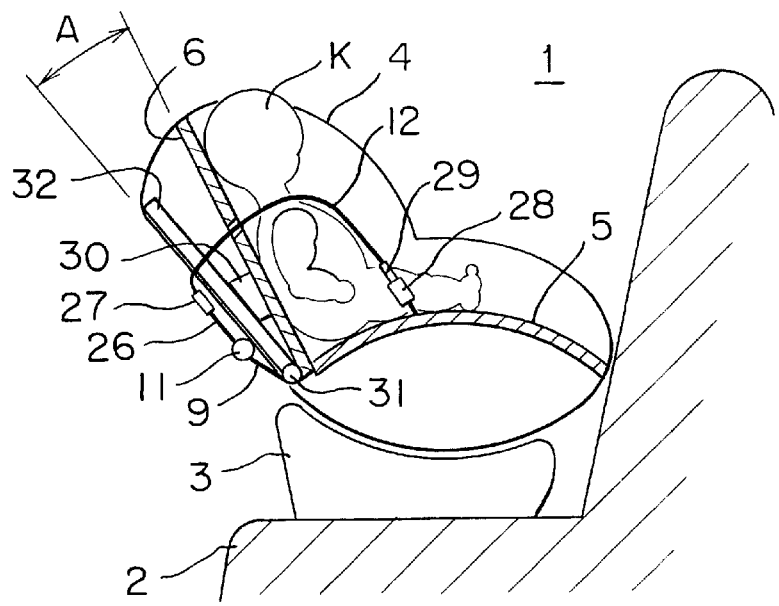
FIG. 5A is a schematic diagram of the child car seat shown in FIG. 4 at the normal time.

FIG. 4 is a partial perspective of the rear side of the back portion that is an essential part of the fourth embodiment. FIG. 5A shows a child car seat at a normal time, and FIG. 5B shows a car seat at an impact time.

The child car seat 1 comprises a base 3, a child car seat body 4 mounted on this base 3, a seat portion 5 and a back portion 6, in which both the seat portion 5 and the back portion 6 are connected to the child car seat body 4. When a child K is carried by a vehicle, the child car seat body 4 is installed on a vehicle seat 2 facing backward. In addition, the seat portion 5 is fixed on the child car seat body 4 as mentioned above, and the bottom end of the back portion 6 is rotatably connected to the child car seat body 4 through a rotating shaft 31.

Further, an auxiliary plate 32 is fixed to the child car seat 4 at the rear side of the back portion 6, and a required angle is formed between the auxiliary plate 32 and the back portion 6. A moving wedge 30 is provided on the rear side of the back portion 6 so that the moving wedge can freely slide in a fan-shaped space between this back portion 6 and the auxiliary plate 32.

Figure 5B:
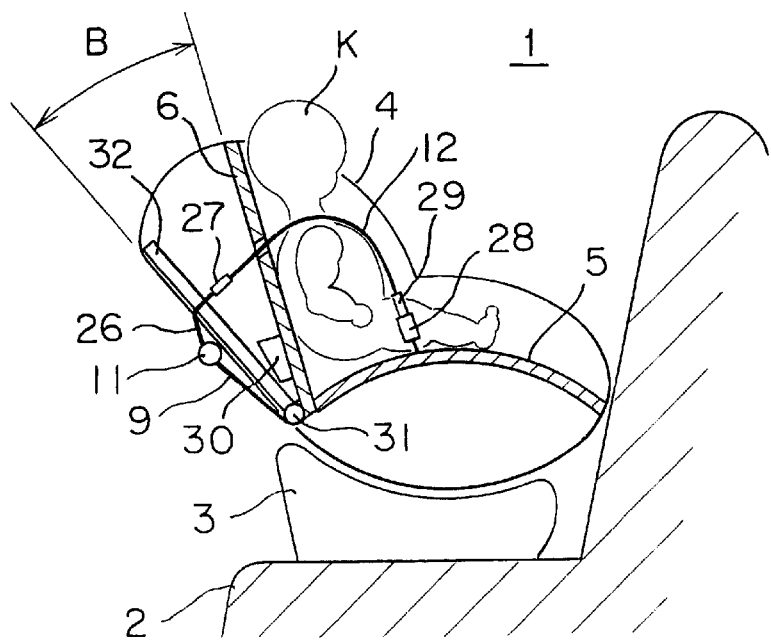
FIG. 5B is the schematic diagram of the child car seat shown in FIG. 4 at the time of impact.

An end of a belt 9 is attached to a lower end of this moving wedge 30, and the belt 9 changes the direction around the shaft 31 installed in the base 3, extends upwardly, and is connected to an emergency lock type retractor 11 located at the rear side of the back portion 6 (on the left side of FIG. 5A and FIG. 5B). This retractor 11 houses a shoulder belt 26 in a wound condition. A belt adjusting fitting 27 is connected to the tip of the shoulder belt 26. One end of the shoulder belt 12 is connected to this belt adjusting fitting 27, and the other end of the shoulder belt 12 is provided with a tongue 28, which can be attached to and detached from a buckle 29 connected to the seat portion 5.

As mentioned above, the up and down motion of the moving wedge 30 placed between the auxiliary plate 32 and the back portion 6 allows the back portion 6 to rotate in the fourth embodiment.

Here, for example as shown in FIG. 5A, the moving wedge 30 is located far away from the rotating shaft 31 at the normal time so that an inclination angle between the back portion 6 and the auxiliary plate 32 is A.

However, if the vehicle is subjected to an impact force caused by a collision and the like, this child K moves upward to abruptly pull the shoulder belt 12 as shown in FIG. 5B. Therefore, the retractor 11 detects the motion to lock drawing of the back belt 26 and the shoulder belt 12. As a result, the belt 9 pulls the lower end of the moving wedge 30 to allow the wedge to move downward. Thus, the back portion 6 rotates clockwise around the rotating shaft 31 as shown in FIG. 5B, so that an angle A between the back portion 6 and the auxiliary plate 32 is increased to an angle B(A<B).

Therefore, a load component of impact force perpendicular to the back portion 6 increases while a load component of that parallel to the back portion drastically decreases to prevent a load concentration on the shoulder portion of the child K. Although the load component perpendicular to the back portion 6 increases in this case, the child is prevented from being subjected to a large load concentration because the load acts on the entire shoulder of the child to reduce the force per unit area.

Fifth Embodiment

Figure 6:
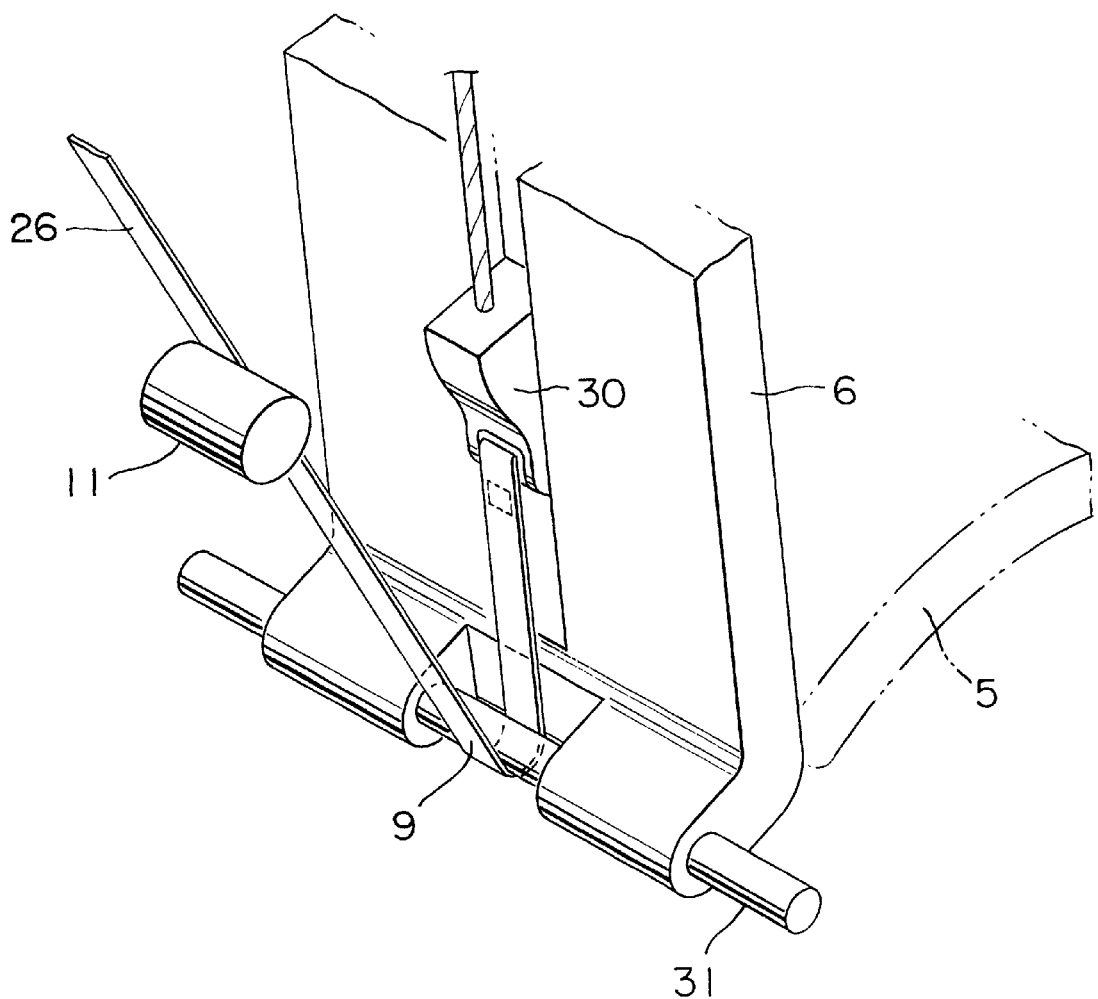
FIG. 6 shows a fifth embodiment of the child car seat of the present invention, in particular a partial perspective of the rear side of the back portion that is the essential part.

FIG. 6 is a partial perspective of the rear side of a back portion that is an essential part of a fifth embodiment, while FIG. 7A shows a child car seat at a normal time and FIG. 7B shows the seat at an impact time.

The difference between the child car seats 1 in FIGS. 6, 7A and 7B and that shown in FIG. 4 is that an inner wall portion of a child car seat body 4 is utilized as a substitute for an auxiliary plate 32 provided on the rear side of the back portion 6 as shown in FIG. 4. The other parts shown in FIGS. 6, 7A and 7B are substantially identical to FIG. 4.

That is, a moving wedge 30 is provided on the rear side of the back portion 6 so that the moving wedge can freely slide in a space between this back portion 6 and the child car seat body 4. An end of a belt 9 is attached to a lower end of this moving wedge 30, and the belt 9 changes the direction around a shaft 31 installed in a base 3, extends upwardly, and is connected to an emergency lock type retractor 11 located at the reverse side of the back portion 6. This retractor 11 houses a back belt 26 in a wound condition. A belt adjusting fitting 27 is connected to the tip of the back belt 26. One end of a shoulder belt 12 is connected to this belt adjusting fitting 27, and the other end of the shoulder belt 12 is provided with a tongue 28, which can be attached to and detached from a buckle 29 connected to a seat portion 5.

As shown in FIG. 7A, the moving wedge 30 is located far away from the rotating shaft 31 at the normal time so that an inclination angle between the back portion 6 and the auxiliary plate 32 becomes A.

However, if a vehicle is subjected to an impact force caused by a collision or the like, this child K moves upward to abruptly pull the shoulder belt 12 as shown in FIG. 5B. Therefore, the retractor 11 detects the motion to lock drawing of the back belt 26 and the shoulder belt 12. As a result, the belt 9 pulls the lower end of the moving wedge 30 to allow the wedge to move downward and then to rotate the back portion 6 clockwise around the rotating shaft 31 in FIG. 7A and FIG. 7B so that an angle A between the inner wall of the child car seat body 4 and the back portion 6 is set to an angle of B(A<B).

Therefore, a load component of the impact force perpendicular to the back portion 6 increases while a load component parallel to the back portion drastically decreases to prevent load concentration on the shoulder portion of the child K. Although the load component perpendicular to the back portion 6 increases in this case, the child is prevented from being subjected to a large load concentration because this load acts on the entire shoulder of the child to reduce the force per unit area.

As mentioned above, the present invention has an effect of providing a comfortable and safe child car seat of a backward-facing type. The top end is rotatably connected to a child car seat body, and the bottom end of the back portion is moved forward to shift the back portion to an upright position at an impact time so that a component of an impact load perpendicular to the back portion increases and an impact load parallel to the back portion decreases. Therefore, a child is prevented from being subjected to a load concentration on the shoulder, and the impact load acts on the entire shoulder to reduce a force per unit area.

What is claimed is:

1. A child car seat comprising:
   a car seat body;
   a back portion having a top end rotatably connected to said car seat body such that said back portion is operable to rotate between a normal position and an impact position, wherein an angle between said back portion and a vertical plane is larger when said back portion is in said normal position than when said back portion is in said impact position;
   a seat portion connected to said car seat body; and
   a spring member connecting a bottom end of said back portion to said seat portion, wherein said back portion is adjacent to said seat portion when said back portion is in said normal position, and said back portion is away from said seat portion when said back portion is in said impact position.

2. The child car seat of claim 1, further comprising a belt device operable to hold a child in said child car seat, and operable to move said bottom end of said back portion away from said seat portion.

3. The child car seat of claim 2, wherein said belt device includes:
   a belt having a first end connected to said bottom end of said back portion;

a shaft arranged so that said belt slides around said shaft;

a retractor connected to a second end of said belt; and a shoulder strap having a first end connected to said retractor and having a second end connected to said seat portion, wherein said belt, said shaft, said retractor, and said shoulder strap are arranged so that a predetermined amount of force applied to said shoulder strap pulls said belt via said retractor around said shaft so as to pull said bottom end of said back portion away from said seat portion.

4. The child car seat of claim 3, wherein said retractor comprises an emergency lock retractor including a housing and a back belt wound in said housing, said retractor being operable to allow said wound back belt to be withdrawn from said housing, and operable to restrict the withdrawal of said wound back belt when a withdrawal force equal to or greater than the predetermined amount of force is applied to said back belt.

5. A child car seat comprising:

a car seat body;

a back portion rotatably connected to said car seat body such that said back portion is operable to rotate between a normal position and an impact position, wherein an angle between said back portion and a vertical plane is larger when said back portion is in said normal position than when said back portion is in said impact position;

a seat portion connected to said car seat body; and a belt for holding a child, said belt being connected between a bottom end of said back portion and said seat portion such that said belt applies force to said back portion so as to rotate said back portion when a predetermined amount of force is applied to said belt by the child.

6. The child car seat of claim 5, wherein said belt includes an emergency lock retractor including a housing and a back belt wound in said housing, said retractor being operable to allow said wound back belt to be withdrawn from said housing, and operable to restrict the withdrawal of said wound back belt when a withdrawal force equal to or greater than the predetermined amount of force is applied to said belt by the child.

7. The child car seat of claim 6, wherein a top end of said back portion is rotatably connected to said car seat body.

8. The child car seat of claim 5, wherein a top end of said back portion is rotatably connected to said car seat body.

* * * * *